US000001501H

United States Statutory Invention Registration [19]

[11] Reg. Number: H1501

Leyse

[45] Published: Nov. 7, 1995

[54] RADIAL FLOW NUCLEAR THERMAL ROCKET (RFNTR)

[75] Inventor: Carl F. Leyse, Idaho Falls, Id.

[73] Assignee: The United States of America as represented by the United States Department of Energy, Washington, D.C.

[21] Appl. No.: 970,888

[22] Filed: Nov. 3, 1992

[51] Int. Cl.[6] ..... G21C 23/00

[52] U.S. Cl. ..... 376/318; 376/457; 376/403

[58] Field of Search ..... 376/317, 318, 376/903, 457; 976/DIG. 307, DIG. 306

[56] References Cited

U.S. PATENT DOCUMENTS

| | | | |
|---|---|---|---|
| 3,270,496 | 9/1966 | Rom | 376/318 |
| 3,378,455 | 4/1968 | Rom et al. | 376/318 |
| 3,546,069 | 4/1970 | McLafferty | 376/318 |
| 3,574,057 | 4/1971 | Rom | 376/318 |

*Primary Examiner*—Donald P. Walsh
*Assistant Examiner*—Frederick H. Voss
*Attorney, Agent, or Firm*—Mark P. Dvorscak; Robert J. Fisher; William R. Moser

[57] ABSTRACT

A radial flow nuclear thermal rocket fuel assembly includes a substantially conical fuel element having an inlet side and an outlet side. An annular channel is disposed in the element for receiving a nuclear propellant, and a second, conical, channel is disposed in the element for discharging the propellant. The first channel is located radially outward from the second channel, and separated from the second channel by an annular fuel bed volume. This fuel bed volume can include a packed bed of loose fuel beads confined by a cold porous inlet frit and a hot porous exit frit. The loose fuel beads include ZrC coated ZrC-UC beads. In this manner, nuclear propellant enters the fuel assembly axially into the first channel at the inlet side of the element, flows axially across the fuel bed volume, and is discharged from the assembly by flowing radially outward from the second channel at the outlet side of the element.

6 Claims, 4 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RADIAL FLOW NUCLEAR THERMAL ROCKET (RFNTR)

CONTRACTUAL ORIGIN OF THE INVENTION

The United States Government has rights in this invention pursuant to Contract No. DE-AC07-76ID01570 between the U.S. Department of Energy and EG&G Idaho, Inc.

BACKGROUND OF THE INVENTION

This invention relates to a low pressure nuclear thermal rocket (LPNTR), and more particularly, an LPNTR that utilizes radial outflow of propellant through radial conical fuel assemblies in a shell-type (spherical, cylindrical, or a combination of both) reactor.

Two decades ago the Space Nuclear Propulsion Office (SNPO) provided guidelines for the design of the Nuclear Engine for Rocket Vehicle Application (NERVA) flight engine then under development. These guidelines provided that reliability and the achievement of the highest probability of mission success were the major design criteria. Next in the order of importance was performance as measured in terms of specific impulse. Then, the engine design should attempt to keep the overall weight as low as possible within the bounds allowed by funds available for development. The relative priorities indicated are equally applicable today to the Space Exploration Initiative recently undertaken by NASA and the Department of Energy (DOE). These overall performance priorities: reliability; specific impulse; and, engine thrust/weight ratio; are basic to the selection of the LPNTR concept.

The relative importance of specific impulse ($I_{sp}$) versus thrust/weight (T/W) ratio is a matter of considerable importance to the optimization of a solid core nuclear thermal rocket (NTR) for space flight. High engine T/W ratio is relatively important to the use of an NTR as a second stage of a launch vehicle or for some military space applications. However, compared to $I_{sp}$, high engine T/W ratio is relatively unimportant for Mars missions and most other missions of potential interest to NASA.

The two engine systems (NRX/EST and XE) tested in the NERVA program utilized a hot-bleed engine cycle with a single turbopump assembly (TPA). A reliability assessment report for the flight version of such an engine noted that the TPA failure rate represented more than fifty percent of the total engine unreliability. Subsequently the NERVA flight engine design was redirected to the use of dual TPA's in the full-flow engine cycle. To achieve the desired engine system reliability, redundancy of major valves was added. The resulting engine system concept that existed at the termination of the NERVA program was quite complex.

The goal of the LPNTR is an engine system without propellant feed pumps: the propellant run tank pressure alone forces the propellant through the engine. An early study based on then current NERVA fuel materials technology indicated potential feasibility for such engines with chamber pressures of about 20 psi and propellant tank pressures of less than 50 psi. Advanced fuel materials technology coupled with an innovative reactor configuration allows extension to even lower chamber pressures and the possibility of greatly improved specific impulse. LPNTR offers attractive potential for achieving a relatively high rating with respect to reliability, specific impulse, and engine thrust/weight ratio.

Accordingly, it is an object of the present invention to provide a nuclear thermal rocket which has high reliability, and high specific impulse with a compatible engine thrust/weight ratio.

Another object of the present invention is to provide a nuclear thermal rocket which is simple in design and operation so as to provide the very high reliability appropriate to manned space flight.

Yet another object of the present invention is to provide a low pressure nuclear thermal rocket that utilizes radial outflow of propellant through radial conical fuel assemblies in a shell-type (spherical, cylindrical, or a combination of both) reactor.

SUMMARY OF THE INVENTION

To achieve the foregoing and other objects, and in accordance with the purposes of the present invention as embodied and described here, a radial flow nuclear thermal rocket fuel assembly includes a substantially conical fuel element having an inlet side and an outlet side. A first annular channel is disposed in the element for receiving a propellant, and a second annular channel is disposed in the element for discharging the propellant. The first channel is located radially outward from the second channel, and separated from the second channel by an annular fuel bed volume. This fuel bed volume can include a packed bed of loose fuel beads confined by a cold porous inlet frit and a hot porous exit frit. The loose fuel beads include ZrC coated ZrC-UC beads. In this manner, nuclear propellant enters the fuel assembly axially into the first channel at the inlet side of the element, flows axially across the fuel bed volume, and is discharged from the assembly by flowing radially outward from the second channel at the outlet side of the element.

In another aspect of the present invention, a radial flow nuclear thermal rocket comprises a shell-type reactor having a thrust chamber including a propellant inlet, reactor core, and a nozzle connected to the thrust chamber. The rocket includes a plurality of substantially conical fuel assemblies, each having an inlet side and an outlet side, the inlet side being adjacent to the propellant inlet, and the outlet side being adjacent to the thrust chamber. Each fuel assembly includes a first axial channel for receiving a propellant, and a second axial channel for discharging the propellant. The first channel is located radially outward from the second channel, and separated from the second channel by an annular fuel bed volume. The fuel assemblies lie in a radial pattern in the reactor core, and each assembly is separated by a moderator. Propellant flows into the propellant inlet, and enters each fuel assembly axially into the first channel at the inlet side of the element, flows radially inward through the fuel bed volume, and is discharged from the assembly by flowing axially outward from the second channel at the outlet side of the element into the thrust chamber and into the nozzle.

DESCRIPTION OF THE DRAWINGS

The above-mentioned and other features of the invention will become more apparent and best understood, together with the description, by reference to the accompanying drawings, in which.

DETAILED DESCRIPTION OF THE INVENTION

Figure 1:
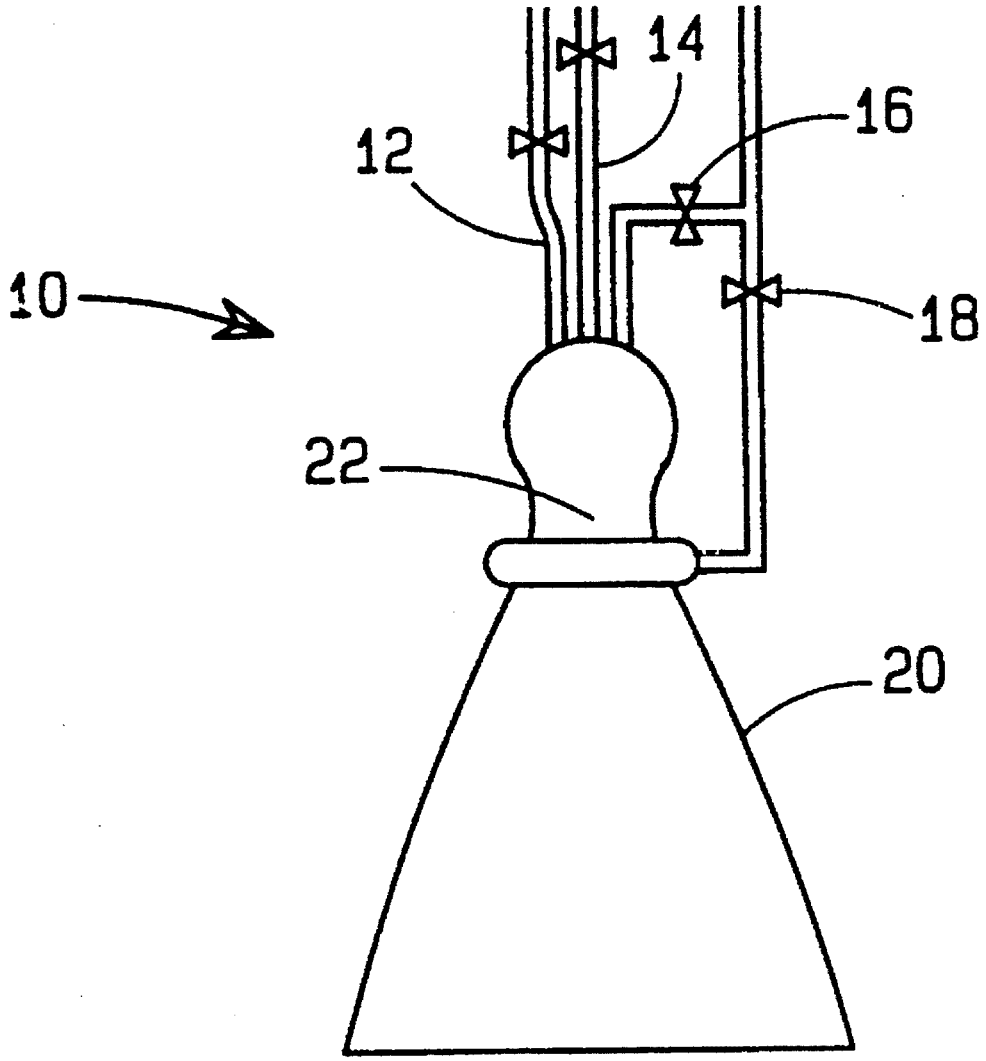
FIG. 1 shows a reference low pressure nuclear thermal rocket having conical fuel assemblies in accordance with the present invention.
Figure 2:
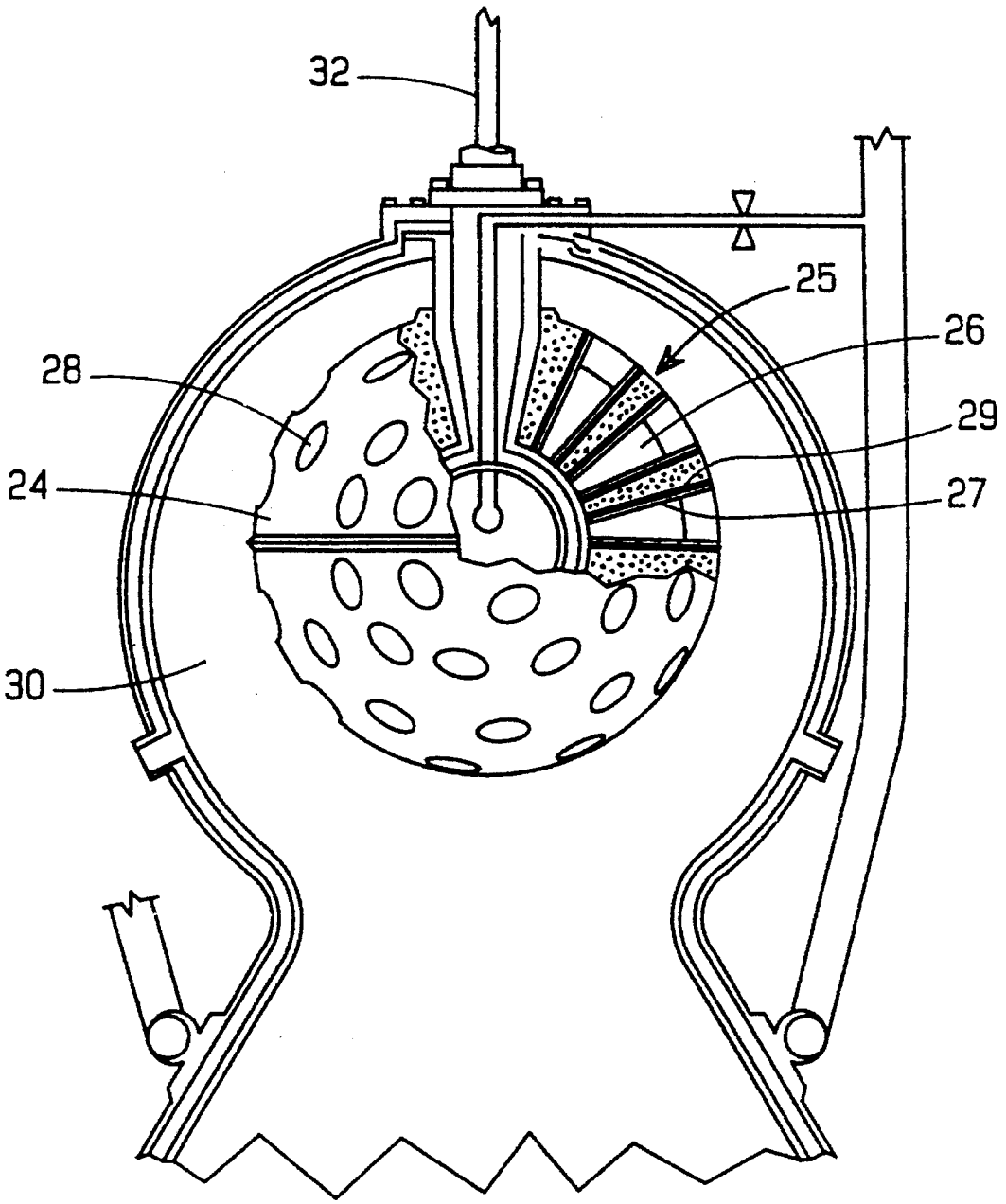
FIG. 2 shows the internal configuration of the low pressure nuclear thermal rocket of FIG. 1.
Figure 4:
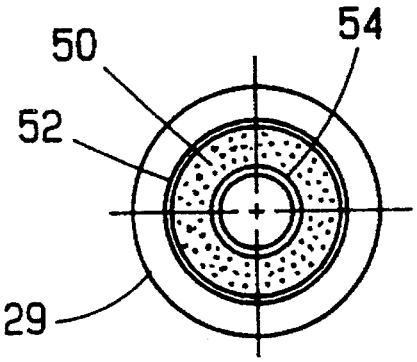
FIG. 4 shows a cross section of the fuel assembly of FIG. 3 taken along the line 4—4.

The LPNTR concept is illustrated by the simplified schematics of FIGS. 1 and 2. The concept is aimed at achieving simplicity in design and operation so as to provide the very high reliability appropriate to manned space flight. Also, to reduce the initial mass in low earth orbit (IMLEO) and cost of flights to Mars and other space destinations, the concept is aimed at high $I_{sp}$ with a compatible T/W. Accordingly, the concept is primarily intended for operation at low (e.g.<50 psi) chamber pressure with the propellant tank pressure forcing the hydrogen propellant through the engine without the benefit of pumps.

A general configuration for a LPNTR 10 is shown in FIG. 1. The rocket 10 includes tank pressurization lines 12, heater lines 14, reactivity control 16, and main propellant feed 18. Also shown is a 40/1 expansion nozzle 20 and throat 22.

The internal configuration of the LPNTR 10 is shown in FIG. 2. A reactor core 24 and reflector structure 25 holds fuel assemblies 26 and is supported from the engine thrust structure. The core 24 and reflector structure 25 is spherical and includes one hundred and twenty (120) fuel assembly conical ports 27 evenly spaced around the sphere. Flow outlet holes 28 provide exits from the fuel ports 27 for the propellant as it enters the thrust chamber 30. A poison rod 32 can also enter the reactor core for safety during launch or during shutdown periods. The core 24 and reflector structure 25 can be made of reactor grade beryllium or a beryllium alloy with a high percentage of beryllium and suitable for nuclear reactor service.

A metallic hydride, e.g. ZrH, can be utilized to enhance neutron moderation in the reactor core 24. Such moderation can be effected by incorporation of a moderator sleeve 29 in each of the fuel assembly conical ports 27 through the reactor core structure. Alternatively, hydride rods can be inserted in the core structure between the fuel assembly ports. This hydride is not clad or coated unless engineering studies indicate it is necessary in order to retain the hydrogen content. Each fuel assembly is held in position by a seal at the reflector exit port 28 and a latch at the reactor core inside diameter.

Figure 3:
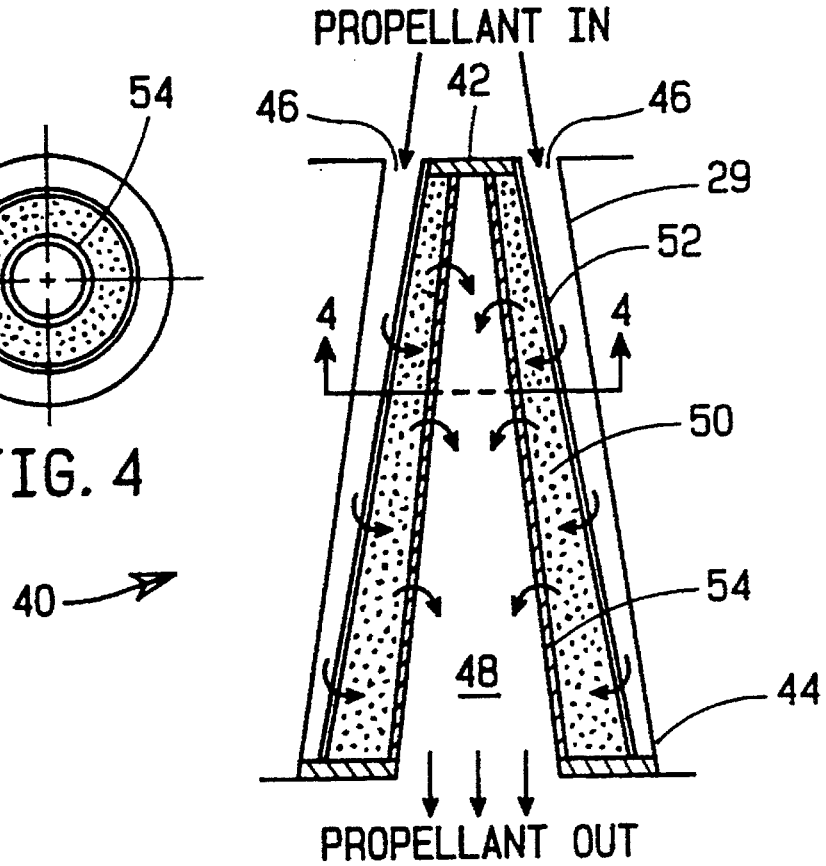
FIG. 3 shows a radial out-flow, axial-radial axial flow fuel assembly in accordance with the present invention.
Figure 5:
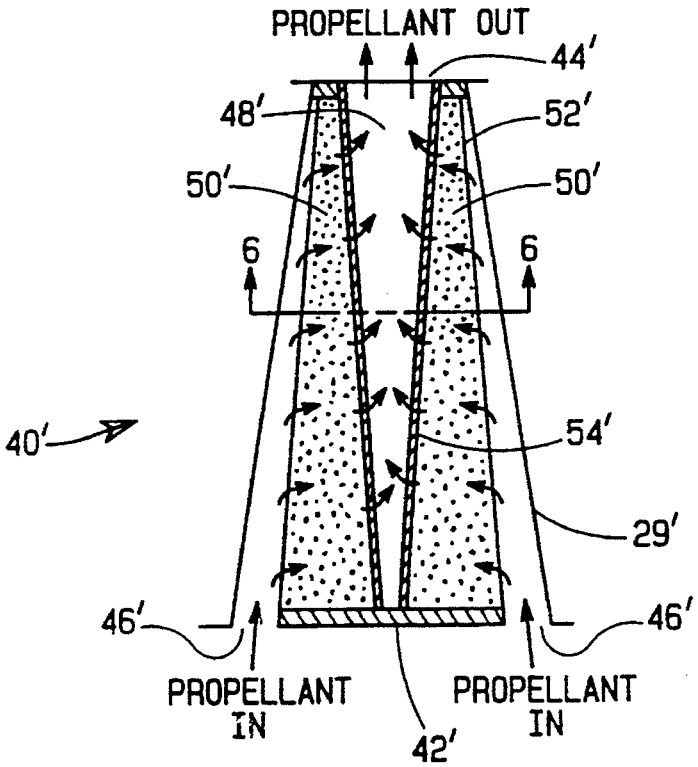
FIG. 5 shows a radial in-flow, axial-radial axial flow fuel assembly in accordance with the present invention.
Figure 6:
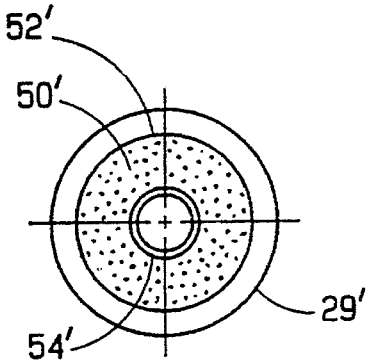
FIG. 6 shows a cross section of the fuel assembly of FIG. 5 taken along the line 6—6.

Two embodiments of axial-radial-axial flow (ARAF) fuel elements in accordance with the present invention are illustrated in FIGS. 3 and 5. FIG. 3*a* shows a radial out-flow assembly and FIG. 5 shows a radial in-flow assembly. Referring to FIG. 3, it can be seen that the fuel element 40 is substantially conical and has an inlet side 42 and outlet side 44. An annular channel 46 is disposed in the element 40 for receiving a propellant. Channel 46 is the inlet channel for the propellant. A second channel 48 is disposed in the fuel element 40 for discharging the nuclear propellant. Channel 48 is conical and is the outlet channel for the propellant. The channel 46 is located radially outward from the second channel 48, and separated from the second channel 48 by an annular fuel bed volume 50.

The radial in-flow element of FIG. 5 is substantially identical to the element of FIG. 3, and therefore, the elements will be designated as primes of those of FIG. 3. Thus, the substantially conical fuel element 40' includes an inlet side 42' and an outlet side 44'. An annular channel 46' is disposed in the element 40' for receiving a propellant. A second channel 48' is also disposed in the element 40' for discharging the propellant. Channel 48' is conical and is the outlet channel for the propellant. The first channel 46' is located radially outward from the second channel 48' and is separated from the second channel 48' by an annular fuel bed volume 50'.

The fuel bed 50 or 50' in either fuel element, is preferred to be a packed bed of loose fuel beads, e.g. ZrC coated ZrC-UC beads, confined by cold porous frit 52 and hot porous frit 54. Other options for the fuel bed include a bed of bonded beads, refractory foam, wire mesh, or fuel wafers. None of these last four options requires either a cold or a hot frit.

In both of the above fuel assemblies, the rocket propellant enters axially along the outside of the assembly into the inlet channel 46 or 46', as indicated by the flow arrows shown in FIGS. 3 and 3. The propellant then flows axially across the fuel bed 50 or 50', and exits the fuel assembly through the frit 54 or 54' and flowing radially out the outlet channel 48 or 48'.

The radial out-flow configuration benefits low pressure nuclear rocket engines because of the larger exit flow area compared to conventional axial flow reactors. The radial in-flow configurations are favorable for small high pressure rocket engines and may also be advantageous for meeting some low thrust or low power requirements. The invention is applicable to a variety of nuclear rocket configurations, and while the reactor shown is spherical, the same basic approach could be used in a cylindrical reactor.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described to best explain the principles of the invention and its practical application and thereby enable others skilled in the art to best utilize the invention in various embodiments and with various modifications as are suited to the particular use contemplated. It is intended that the scope of the invention be defined by the claims appended hereto.

The embodiments of the invention in which exclusive property rights or privileges are claimed are defined as follows:

1. A radial flow nuclear thermal rocket fuel assembly comprising:

a) a substantially conical fuel element having an inlet side and an outlet side;

b) a first annular channel disposed in the element for receiving a nuclear propellant;

c) a second channel disposed in the element for discharging the nuclear propellant, the annular channel being located radially outward from the second channel, and separated from the second channel by an annular fuel bed volume;

whereby the propellant enters the fuel assembly axially into the first channel at the inlet side of the element, flows axially across the fuel bed volume, and is discharged from the assembly by flowing radially outward from the second channel at the outlet side of the element.

2. The fuel assembly of claim 1 wherein the fuel bed volume includes a packed bed of loose fuel beads confined by a cold porous inlet frit and a hot porous exit frit.

3. The fuel assembly of claim 2 wherein the fuel beads include ZrC coated ZrC-UC beads.

4. A radial flow nuclear thermal rocket comprising:

a) a shell-type reactor having a thrust chamber including a propellant inlet, reactor core, and a nozzle connected to the thrust chamber, b) a plurality of substantially conical fuel assemblies each having an inlet side and an outlet side, the inlet side being adjacent to the propellant inlet, and the outlet side being adjacent to the thrust chamber, c) each fuel assembly including a first axial channel for receiving a propellant, a second axial channel for discharging the propellant, the first channel being located radially outward from the second channel, and separated from the second channel by an annular fuel bed volume;

d) the fuel assemblies lying in a radial pattern in the reactor core, and each assembly being separated by a moderator, whereby propellant flows into the propellant inlet, and enters each fuel assembly axially into the first channel at the inlet side of the element, flows axially across the fuel bed volume, and is discharged from the assembly by flowing radially outward from the second channel at the outlet side of the element into the thrust chamber and into the nozzle.

5. The fuel assembly of claim 4 wherein the fuel bed volume includes a packed bed of loose fuel beads confined by a cold porous inlet frit and a hot porous exit frit.

6. The fuel assembly of claim 5 wherein the fuel beads include ZrC coated ZrC-UC beads.

* * * * *